US009219425B2

(12) United States Patent
Sano et al.

(10) Patent No.: US 9,219,425 B2
(45) Date of Patent: Dec. 22, 2015

(54) ELECTRIC POWER CONVERTER

(71) Applicant: DENSO CORPORATION, Kariya, Aichi-pref. (JP)

(72) Inventors: Tomohisa Sano, Okazaki (JP); Takahisa Kaneko, Okazaki (JP); Kenshiro Hida, Chiryu (JP); Kenji Funahashi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 13/845,657

(22) Filed: Mar. 18, 2013

(65) Prior Publication Data
US 2013/0272043 A1 Oct. 17, 2013

(30) Foreign Application Priority Data

Apr. 13, 2012 (JP) ................................. 2012-091616

(51) Int. Cl.
H02M 7/00 (2006.01)
B60L 3/00 (2006.01)
H02M 1/32 (2007.01)

(52) U.S. Cl.
CPC .............. *H02M 7/003* (2013.01); *B60L 3/003* (2013.01); *B60L 2240/36* (2013.01); *H02M 2001/322* (2013.01)

(58) Field of Classification Search
CPC ............................. H02M 7/003; H01L 23/473
USPC ............................. 363/141, 144; 361/698, 699
See application file for complete search history.

(56) References Cited

U.S. PATENT DOCUMENTS

| 7,200,007 | B2* | 4/2007 | Yasui et al. | 361/716 |
| 7,248,478 | B2* | 7/2007 | Inoue | 361/699 |
| 7,830,689 | B2* | 11/2010 | Nakamura et al. | 363/141 |
| 7,969,735 | B2* | 6/2011 | Nakatsu et al. | 361/699 |
| 8,212,382 | B2* | 7/2012 | Nakatsu et al. | 307/9.1 |
| 8,324,691 | B2* | 12/2012 | Hirose et al. | 257/378 |
| 8,612,073 | B2* | 12/2013 | Fuji et al. | 701/22 |
| 8,791,681 | B2* | 7/2014 | Akaishi et al. | 323/288 |
| 8,848,408 | B2* | 9/2014 | Shindo et al. | 363/56.02 |
| 2012/0055727 | A1* | 3/2012 | Omiya et al. | 180/279 |
| 2013/0265724 | A1* | 10/2013 | Kaneko | H01L 21/50 361/715 |

FOREIGN PATENT DOCUMENTS

| JP | 2011-210026 | 10/2011 |
| JP | 2011-259517 | 12/2011 |
| JP | 2011-259544 | 12/2011 |
| JP | 2013-009581 | 1/2013 |

* cited by examiner

Primary Examiner — Timothy J Dole
Assistant Examiner — Htet Z Kyaw
(74) Attorney, Agent, or Firm — Nixon & Vanderhye PC

(57) ABSTRACT

An electric power converter includes a semiconductor module that has a semiconductor element therein, a cooler that cools the semiconductor module, a circuit board provided with a semiconductor control circuit that controls the semiconductor module, a capacitor electrically connected to the semiconductor module, and a quick discharge resistor for discharging an electric charge accumulated in the capacitor. The circuit board is provided with a discharge control circuit that controls a current that flows into the quick discharge resistor. The semiconductor module, the cooler, the capacitor, and the quick discharge resistor are disposed on one major surface of the circuit board.

9 Claims, 7 Drawing Sheets

ELECTRIC POWER CONVERTER

CROSS-REFERENCE TO RELATED APPLICATION

The application is based on and claims the benefit of priority from earlier Japanese Patent Application No. 2012-91616 filed Apr. 13, 2012, the description of which is incorporated herein by reference.

TECHNICAL FIELD

The present disclosure relates to an electric power converter that has discharge resistor that discharges an electric charge accumulated in a capacitor.

BACKGROUND

An electric power converter installed in an electric vehicle or a hybrid vehicle, etc. has a semiconductor module, a cooler, a circuit board, and a capacitor, for example.

The semiconductor module has a semiconductor element therein, while the cooler cools the semiconductor module.

A semiconductor control circuit that controls the semiconductor module is provided on the circuit board, while the capacitor is electrically connected to the semiconductor module.

In the electric power converter, a discharge resistor for discharging an electric charge accumulated in the capacitor is connected in parallel to the capacitor (refer to Japanese Patent Application Laid-Open Publication No. 2011-210026, for example).

By this, it is constituted that the electric charge of the capacitor can be discharged through the discharge resistor when an engine has stopped, etc.

However, quick discharging of the electric charge accumulated in the capacitor of the electric power converter is called for in recent years in emergency situations such as a collision of vehicles or other unusual detections, etc.

However, since a resistance value of the discharge resistor is configured larger from a viewpoint of preventing electric power loss during a regular operation, it is difficult to discharge the electric charge quickly through the discharge resistor.

Then, for the electric discharge in emergencies, it is considered that a quick discharge resistor with comparatively small resistance value should be connected to the capacitor while a current that flows into the quick discharge resistor is controlled by a discharge control circuit.

Thereby, it can be constituted that the discharge control circuit can permit the electric discharge using the quick discharge resistor in emergency situations, and the electric charge accumulated in the capacitor may be discharged in a short time.

However, providing the quick discharge resistor and the discharge control circuit in the electric power converter has a possibility of causing the following problems.

That is, if a circuit board is prepared anew in order to provide the discharge control circuit, an increase in a number of parts, enlargement of the body, and an increase in assembling man-hours will be caused in the electric power converter.

Moreover, depending on a spatial relationship of the quick discharge resistor and the circuit board in which the discharge control circuit is provided and other component parts, there is a possibility that a connecting means between the parts including the circuit board may become complicated, and assembling man-hours may increase.

SUMMARY

An embodiment provides an electric power converter that enables a quick electric discharge while reducing a number of parts, miniaturizing a body, and reducing assembling man-hours.

In an electric power converter according to a first aspect, the electric power converter includes a semiconductor module that has a semiconductor element therein, a cooler that cools the semiconductor module, a circuit board provided with a semiconductor control circuit that controls the semiconductor module, a capacitor electrically connected to the semiconductor module, and a quick discharge resistor for discharging an electric charge accumulated in the capacitor.

The circuit board is provided with a discharge control circuit that controls a current that flows into the quick discharge resistor.

The semiconductor module, the cooler, the capacitor, and the quick discharge resistor are disposed on one major surface of the circuit board.

The electric power converter mentioned above has the quick discharge resistor and the discharge control circuit, and is able to control the current that flows into the quick discharge resistor using the discharge control circuit.

Thereby, it becomes possible to set the resistance value of the quick discharge resistor smaller to some extent, and it becomes possible in an emergency to quickly discharge the electric charge accumulated in the capacitor using the quick discharge resistor.

Moreover, the discharge control circuit is provided on the circuit board.

That is, the discharge control circuit is formed on a single circuit board together with the semiconductor control circuit.

Therefore, the increase in the number of parts by providing the discharge control circuit can be prevented.

In connection with this, it becomes easy to miniaturize the body of the electric power converter 1 as a whole, and assembling man-hours can be reduced.

Moreover, the semiconductor module, the cooler, the capacitor, and the quick discharge resistor are disposed on one major surface of the circuit board.

Thereby, when attaching the semiconductor module, the capacitor, and the quick discharge resistor to the circuit board, it becomes possible to attach these components from the same surface side.

Thus, assembling man-hours of the electric power converter can be reduced greatly.

According to the present disclosure mentioned above, the electric power converter that enables quick electric discharge while reducing the number of parts, miniaturizing the body, and reducing assembling man-hours can be provided.

The electric power converter can be considered as an inverter, a converter, etc. installed in an electric vehicle, a hybrid vehicle, etc., for example.

The discharge control circuit can be constituted to permit the current to flow into the quick discharge resistor in emergency situations such as a collision of vehicles or other unusual detections, etc., and to suppress the current flow to the quick discharge resistor during normal functioning (at the normal time), for example.

Here, during normal functioning, the current flowing into the quick discharge resistor can be intercepted completely, or can be reduced to below a fixed amount, for example.

In the electric power converter according to a second aspect, the semiconductor module, the capacitor, and the quick discharge resistor are disposed in parallel along the one major surface of the circuit board.

In the electric power converter according to a third aspect, the quick discharge resistor is disposed within the perimeter of the circuit board when seen from a normal direction of the circuit board.

In the electric power converter according to a fourth aspect, the quick discharge resistor has connecting terminals that are connected to the circuit board and are formed by projecting them towards the circuit board.

In the electric power converter according to a fifth aspect, a plurality of semiconductor modules and a plurality of cooling pipes that constitute the cooler are laminated to constitute a laminated body, and the quick discharge resistor is disposed at one end side of a laminating direction of the laminated body.

In the electric power converter according to a sixth aspect, the quick discharge resistor is disposed adjoining the cooling pipe disposed on the one end in the laminated body.

In the electric power converter according to a seventh aspect, a force-pressing component is disposed in the one end side in the lamination direction of the laminated body, the force-pressing component intervenes between the laminated body and a part of a frame that holds the laminated body, and the frame is formed unitarily with a resistor accommodation part where the quick discharge resistor is accommodated.

In the electric power converter according to an eighth aspect, the force-pressing component is constituted by a leaf spring, the frame has a pair of support sections that support both ends of the leaf spring, and the resistor accommodation part is formed between the pair of support sections.

DETAILED DESCRIPTION OF THE PREFERRED EMBODIMENTS

[First Embodiment]

With reference to FIG. 1 to FIG. 4, hereinafter will be described an embodiment of an electric power converter.

Figure 1:
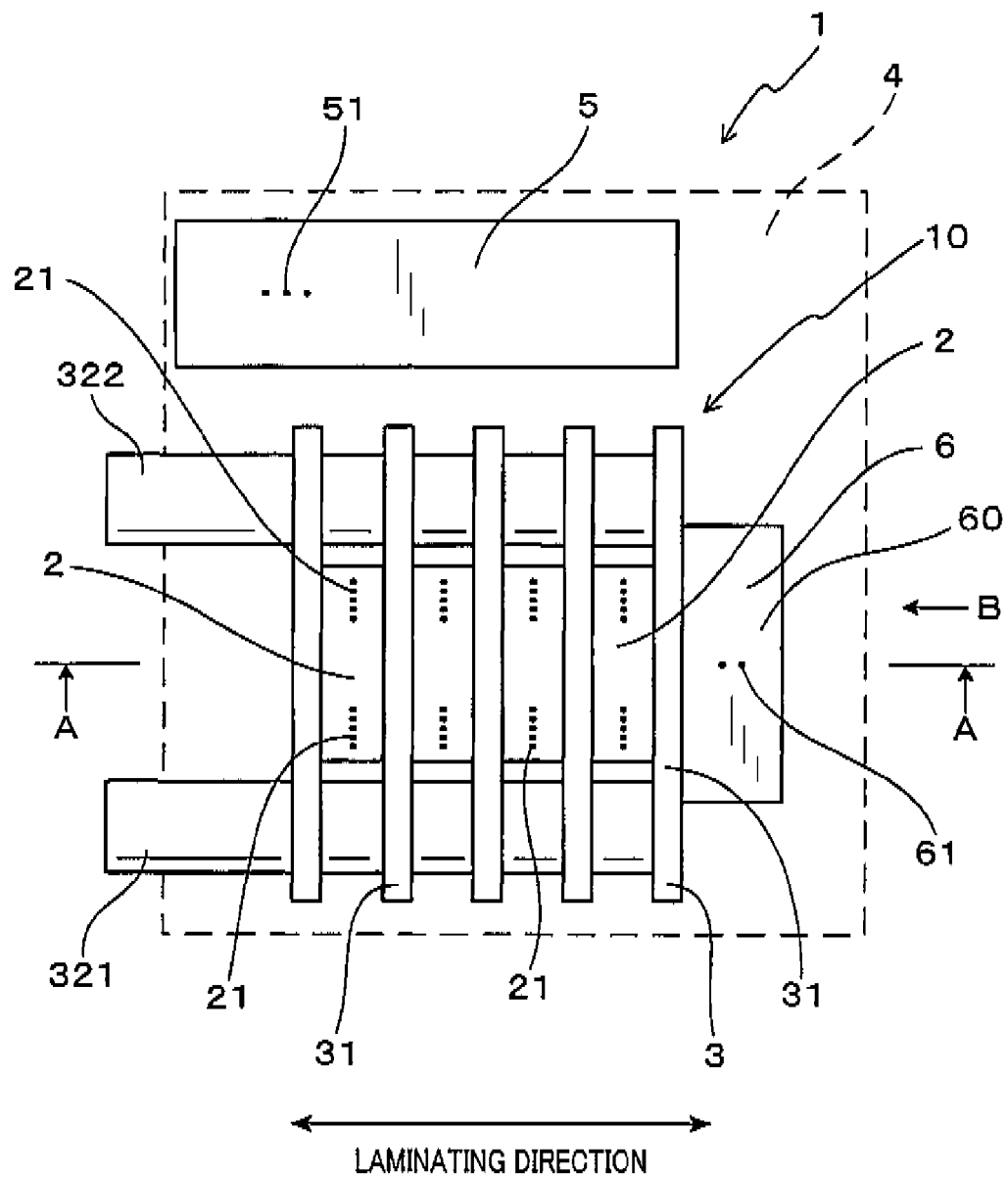
FIG. 1 shows a plan view of an electric power converter in a first embodiment.
Figure 2:
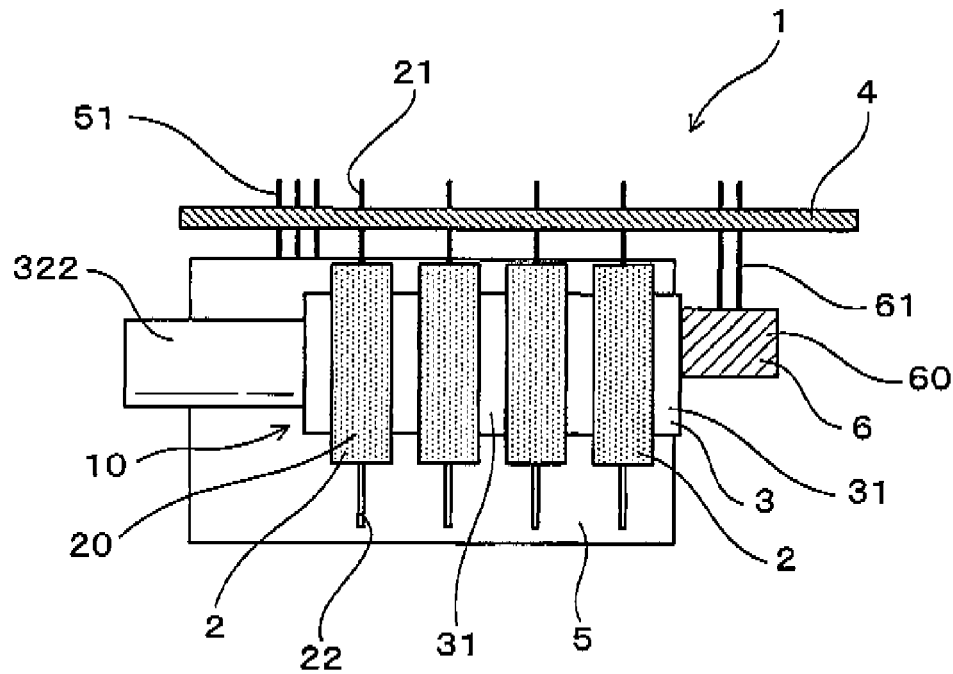
FIG. 2 shows a sectional view along a line A-A of FIG. 1.
Figure 3:
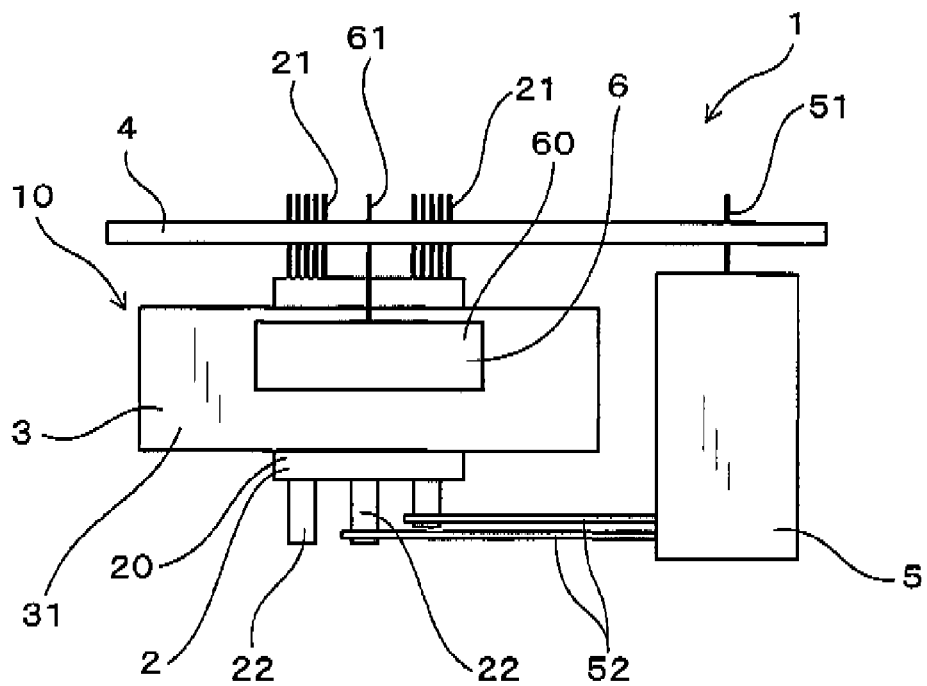
FIG. 3 shows a vertical view seen from B of FIG. 1.

An electric power converter 1 of the present embodiment includes, as shown in FIG. 1 to FIG. 3, a semiconductor module 2, a cooler 3, a circuit board 4, a capacitor 5, and a quick discharge resistor 6.

The semiconductor module 2 has a semiconductor element therein. The cooler 3 cools the semiconductor module 2. A semiconductor control circuit 41 that controls the semiconductor module 2 is provided on the circuit board 4. The capacitor 5 is electrically connected to the semiconductor module 2. The quick discharge resistor 6 is for discharging an electric charge accumulated in the capacitor 5.

Moreover, a discharge control circuit 42 that controls a current that flows into the quick discharge resistor 6 is provided on the circuit board 4.

The semiconductor module 2, the cooler 3, the capacitor 5, and the quick discharge resistor 6 are disposed on one major surface of the circuit board 4.

Moreover, the semiconductor module 2, the capacitor 3, and the quick discharge resistor 6 are disposed in parallel along the one major surface of the circuit board 4.

That is, the semiconductor module 2, the capacitor 3, and the quick discharge resistor 6 are disposed along with a spreading direction of the circuit board 4 without overlapping with a normal direction of the circuit board 4 with each other.

These components are disposed on the one major surface of the circuit board 4 adjoining each other.

Moreover, as shown in FIG. 1, the quick discharge resistor 6 is disposed within the perimeter of the circuit board 4 when seen from the normal direction of the circuit board 4.

In the present embodiment, not only the quick discharge resistor 6 but the semiconductor module 2 and the capacitor 3 are disposed within the perimeter of the circuit board 4 when seen from the normal direction of the circuit board 4.

Further, the quick discharge resistor 6 has connecting terminals 61 that are connected to the circuit board 4 and formed by projecting them towards the circuit board 4.

The quick discharge resistor 6 has a pair of pin-like connecting terminals 61 from a main resistor part 60 that has a resistive element therein.

The pair of connecting terminals 61 are projected from the main resistor part 60 to the circuit board 4 side, and are connected to the circuit board 4.

Figure 4:
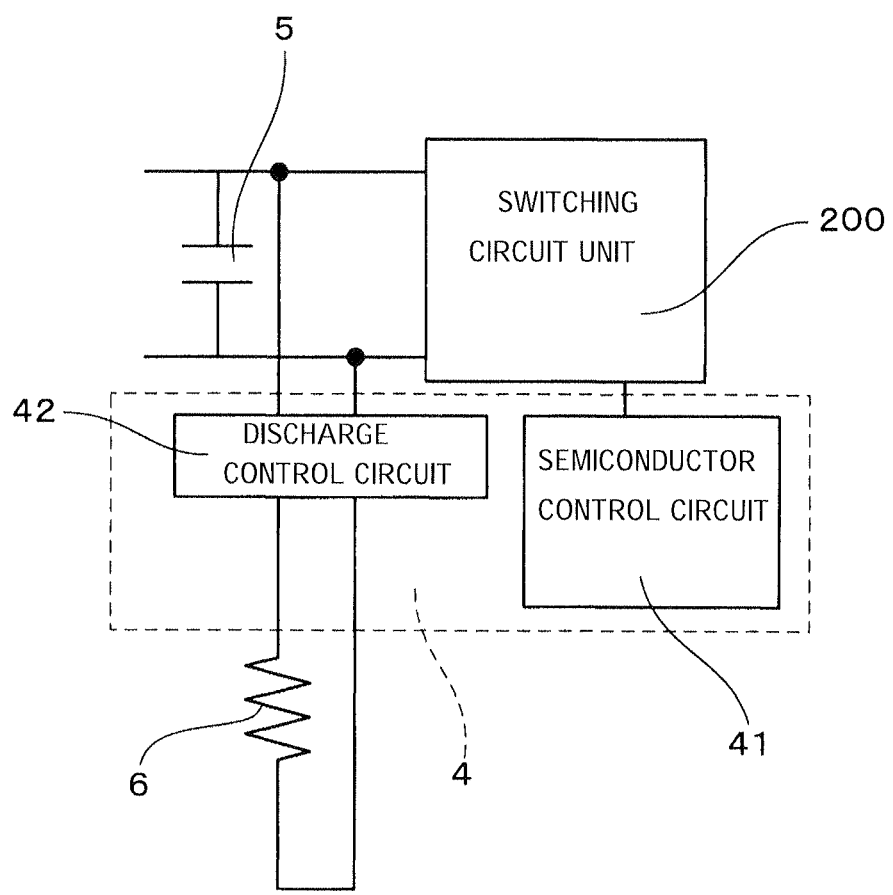
FIG. 4 shows a circuit configuration diagram of the electric power converter in the first embodiment.

Thereby, as shown in FIG. 4, the quick discharge resistor 6 and the discharge control circuit 42 provided on the circuit board 4 are electrically connected.

Moreover, the discharge control circuit 42 is electrically connected with a pair of electrodes 52 of the capacitor S.

That is, the quick discharge resistor 6 is connected with the capacitor 5 through the discharge control circuit 42.

In addition, a component shown with a reference number 200 in FIG. 4 is a switching circuit unit constituted by a plurality of semiconductor modules 2 mentioned above.

The electric power converter 1 of the present embodiment is an inverter installed in an electric vehicle, a hybrid vehicle, etc., and is constituted to perform electric energy conversion between a direct-current power supply (not shown) and three-phase alternating current rotation electrical machinery (not shown).

Moreover, the capacitor 5 is a smoothing capacitor wired between the direct-current power supply and an inverter circuit, and smooths a voltage of direct-current electric power.

Further, the electric power converter 1 may have a converter circuit that boosts or steps-down the direct-current electric power between the direct-current power supply and the inverter circuit.

In this case, the capacitor 5 is disposed between the converter circuit and the inverter circuit.

Moreover, as shown in FIG. 1 and FIG. 2, a plurality of semiconductor modules 2 and a plurality of cooling pipes 31 that constitute the cooler 3 are laminated to constitute a laminated body 10.

The quick discharge resistor 6 is disposed at one end in a laminating direction (left-right in FIG. 1) of the laminated body 10.

The quick discharge resistor 6 is disposed adjoining the cooling pipe 31 disposed on the one end in the laminated body 10.

In particular, in the present embodiment, the quick discharge resistor 6 contacts with the cooling pipe 31.

The laminated body 10 laminates a plurality of semiconductor modules 2 and a plurality of cooling pipes 31 alternately.

The adjoining cooling pipes 31 of the cooler 3 are connected with each other in both ends in a longitudinal direction of the cooling pipes 31.

Moreover, a coolant introducing pipe 321 and a coolant discharging pipe 322 are projected in the lamination direction from the cooling pipe 31 disposed on another end of the lamination direction.

In addition, the cooler 3 is made of metal, such as aluminum.

Moreover, in the semiconductor module 2, a plurality of control terminals 21 and a plurality of power terminals 22 are projected in opposite directions to each other from the main element part 20 that has the semiconductor element, such as IGBT, therein.

The plurality of control terminals 21 are projected in a direction that intersects perpendicularly with both the lamination direction of the laminated body 10 and the longitudinal direction of the cooling pipes 31.

Further, the circuit board 4 is disposed in this direction, and the control terminals 21 of the semiconductor module 2 are connected to the circuit board 4.

The connecting terminals 61 of the quick discharge resistor 6 mentioned above are projected in the same direction as the control terminals 21 of the semiconductor module 2.

Moreover, as shown in FIG. 3, the three power terminals 22 are projected to the side opposite to the control terminals 21 in the semiconductor module 2.

One of the three power terminals 22 is connected to a terminal of the rotary electric machine (not shown) driven by the electric power converter 1 and the other two are connected to the pair of electrodes 52 of the capacitor 5, In addition, each semiconductor module 2 has a plurality of semiconductor elements therein in the present embodiment.

Moreover, although the pair of electrodes 52 of the capacitor 5 are connected to the different power terminals 22 in the semiconductor module 2 as mentioned above, the electrodes 52 are also connected to the circuit board 4.

That is, the electrodes 52 are electrically connected also to terminals 51 for voltage detection (henceforth voltage detection terminals 51) projected to the circuit board 4 side in addition to a connected part with the semiconductor module 2, and the terminal 51 for the voltage detection is connected to the circuit board 4.

Thereby, as shown in FIG. 4, the capacitor 5 is electrically connected to the discharge control circuit 42 provided on the circuit board 4.

As mentioned above, the control terminals 21 of the plurality of semiconductor modules 2, the voltage detection terminals 51 of the capacitor 5, and the connecting terminals 61 of the quick discharge resistor 6 are projected in the same directions mutually, which is towards the circuit board 4, and each terminal is connected to the circuit board 4.

Each terminal is inserted through a through hole (not shown) provided on the circuit board 4 and may be connected by a solder.

Moreover, the electric power converter 1 has a regular discharge resistor (not shown) that discharges an electric charge during normal functioning independently from the quick discharge resistor 6.

That is, the regular discharge resistor is also connected to the pair of electrodes 52 of the capacitor 5.

Further, it is constituted that the electric charge accumulated in the capacitor 5 can be gradually discharged from the regular discharge resistor when an engine has stopped after regular operation, etc.

Not like the quick discharge resistor 6, the regular discharge resistor is disposed so that the electric charge may be discharged regularly without a current flow being controlled by a control circuit etc.

Therefore, in order to prevent the electric power loss, etc. during normal functioning, the regular discharge resistor has an enlarged resistance value to some extent.

Thus, the electric charge is discharged gradually in the regular discharge resistor.

On the other hand, in order for the quick discharge resistor 6 to quickly discharge the electric charge accumulated in the capacitor 5 in emergency situations such as a collision of vehicles or other unusual detections, etc., the resistance value is configured smaller than that of the regular discharge resistor.

Further, an electric power loss, overheating, etc. are prevented during normal functioning by controlling that current does not flow into the quick discharge resistor 6 or the current that flows into the quick discharge resistor 6 is small enough by the discharge control circuit 42.

Next, function and effect of the present embodiment is explained.

The electric power converter 1 has the quick discharge resistor 6 and the discharge control circuit 42, and is able to control the current that flows into the quick discharge resistor 6 by the discharge control circuit 42.

Thereby, it becomes possible to set the resistance value of the quick discharge resistor 6 smaller to some extent, and it becomes possible in the emergency to quickly discharge the electric charge accumulated in the capacitor 5 from the quick discharge resistor 6.

Moreover, the discharge control circuit 42 is provided on the circuit board 4.

That is, the discharge control circuit 42 is formed on the single circuit board 4 together with the semiconductor control circuit 41.

Therefore, the increase in the number of parts by providing the discharge control circuit 62 can be prevented.

In connection with this, it becomes easy to miniaturize the body of the electric power converter 1 as a whole, and assembling man-hours can be reduced.

Moreover, the semiconductor module 2, the cooler 3, the capacitor 5, and the quick discharge resistor 6 are disposed on one major surface of the circuit board 4.

Thereby, when attaching the semiconductor module 2, the capacitor 5, and the quick discharge resistor 6 to the circuit board 4, it becomes possible to attach these components from the same surface side.

Thus, assembling man-hours can be reduced greatly.

Moreover, the semiconductor module 2, the capacitor 3, and the quick discharge resistor 6 are disposed in parallel along the one major surface of the circuit board 4.

Further, since all of the semiconductor module 2, the capacitor 5 and the quick discharge resistor 6 can be disposed closer to the circuit board 4, the ease of assembling of these components can be raised.

Furthermore, the quick discharge resistor 6 is disposed within the perimeter of the circuit board 4 when seen from the normal direction of the circuit board 4.

Therefore, expansion of the body of the electric power converter 1 in the spreading direction of the circuit board 4 can be prevented.

As a result, the miniaturization of the electric power converter 1 can be attained.

Moreover, the quick discharge resistor 6 has the connecting terminals 61 that are connected to the circuit board 4 and are formed by projecting them towards the circuit board 4.

Thereby, the quick discharge resistor 6 can be easily connected to the circuit board 4 by the connecting terminals 61 without using other connecting means.

As a result, the assembling man-hours of the electric power converter 1 can be reduced.

Moreover, the plurality of semiconductor modules 2 and the plurality of cooling pipes 31 are laminated to constitute the laminated body 10.

In addition, the quick discharge resistor 6 is disposed at the one end side of the laminating direction of the laminated body 10.

Thereby, while cooling the plurality of semiconductor modules 2 effectively, the quick discharge resistor 6 can also be cooled by the cooler 3 for cooling the semiconductor module 2.

In particular, high current flows in the quick discharge resistor 6 in emergency situations and generates a large amount of heat due to this.

Therefore, although it is necessary to cool the greatly heated quick discharge resistor 6, if a cooler is formed anew, the electric power converter 1 becomes enlarged.

Then, by disposing the quick discharge resistor 6 at the one end side of the laminating direction of the laminated body 10, where is near the cooling pipe 31 that constitutes the cooler 3 for cooling the semiconductor module 2, it can be constituted that the quick discharge resistor 6 can be cooled without enlarging the electric power converter 1.

Moreover, the quick discharge resistor 6 is disposed adjoining the cooling pipe 31 disposed on the one end in the laminated body 10.

Thereby, the quick discharge resistor 6 can be effectively cooled via the cooling pipe 31.

Especially in the present embodiment, since the quick discharge resistor 6 is contacted to the cooling pipe 31, the quick discharge resistor 6 can be cooled effectively.

According to the present embodiment mentioned above, the electric power converter that enables the quick electric discharge while reducing the number of parts, miniaturizing the body, and reducing assembling man-hours can be provided.

[Second Embodiment]

It should be appreciated that, in the following embodiment, components identical with or similar to those in the first embodiment are given the same reference numerals for the sake of omitting unnecessary explanation.

Figure 5:
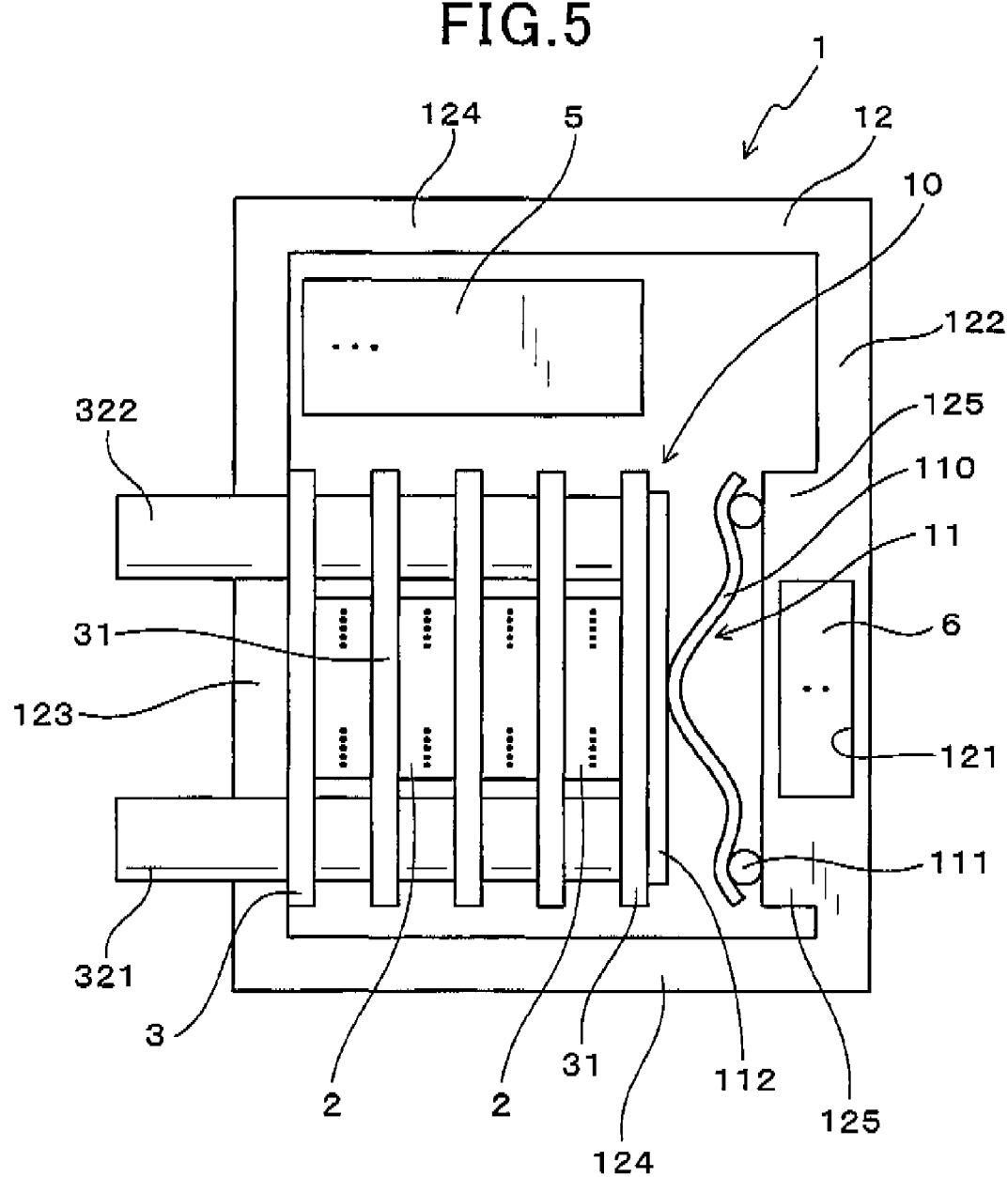
FIG. 5 shows a plan view of an electric power converter in a second embodiment.

In addition, although the circuit board 4 is not disclosed in FIG. 5, composition, arrangement, etc. of the circuit board 4 are the same as those of the first embodiment.

The present embodiment is an example of the electric power converter 1 that has a force-pressing component 11 disposed in the one end side in the lamination direction of the laminated body 10, as shown in FIG. 5. The laminated body 10 is force-pressed by the force-pressing component 11 in the lamination direction.

The force-pressing component 11 intervenes between the laminated body 10 and a part of a frame 12 that holds the laminated body 10.

The frame 12 is formed unitarily with a resistor accommodation part 121 where the quick discharge resistor 6 is accommodated.

The laminated body 10 is disposed, for example, inside the frame 12 made of metal, such as aluminum.

The frame 12 has a substantially rectangular frame body opened in the projection direction of the control terminals 21 of the semiconductor module 2 and the power terminal 22. The frame body has a rear wall part 122 disposed in one side of the lamination direction, a front wall part 123 disposed in another side of the lamination direction, and a pair of side wall parts 124 formed so that the rear wall part 122 and the front wall part 123 are connected in ends in the longitudinal direction of the cooling pipe 31.

Here, "front" and "rear" are expedient expressions, and are not limited especially to being in a relation with the vehicles, etc.

The force-pressing component 11 is constituted by a leaf spring 110. This leaf spring 110 is disposed between the end of the laminated body 10 and the rear wall part 122 of the frame 12.

The frame 12 has a pair of support sections 125 that support both ends of the leaf spring 110.

The support sections 125 have a thickness in the lamination direction larger than other parts of the rear wall part 122, and have a high rigidity.

The both ends of the leaf spring 110 are supported by the support sections 125 through support pins 111.

Moreover, a contacting board 112 intervenes between the leaf spring 110 and the laminated body 10.

The contacting board 112 is constituted so that the cooling pipe 31 disposed in the leaf spring 110 side of the cooler 3 is prevented from deforming by a direct pressure of the leaf spring 110.

The leaf spring 110 is disposed in a predetermined position in a state compressed in the lamination direction, and thereby, force-presses the laminated body 110 toward the front wall part 123 side.

The resistor accommodation part 121 is formed between the pair of support sections 125, and the quick discharge resistor 6 is disposed in the resistor accommodation part 121.

Others are the same as those of the first embodiment.

In the present embodiment, since the resistor accommodation part 121 is formed unitarily as the part of frame 12, the number of the parts can be reduced.

Moreover, the quick discharge resistor 6 can be effectively cooled via the frame 12 by forming the resistor accommodation part 121 in the frame 12.

Further, since the resistor accommodation part 121 is formed between the pair of support sections 125, the electric power converter 1 can be miniaturized efficiently.

That is, since the support sections 125 are portions that support the force-pressing component 11, the thickness in the lamination direction surely becomes large in order to bear the load received from the force-pressing component 11.

Then, a comparatively large dead space exists between the pair of support sections 125, and by disposing the resistor accommodation part 6 to this space, space can be saved in the electric power converter 1 a whole, and the miniaturization of the electric power converter 1 can be attained.

In addition, it has the same function and effect as the first embodiment.

[Third Embodiment]

It should be appreciated that, in the following embodiment, components identical with or similar to those in the first and second embodiments are given the same reference numerals for the sake of omitting redundant explanation.

Figure 6:
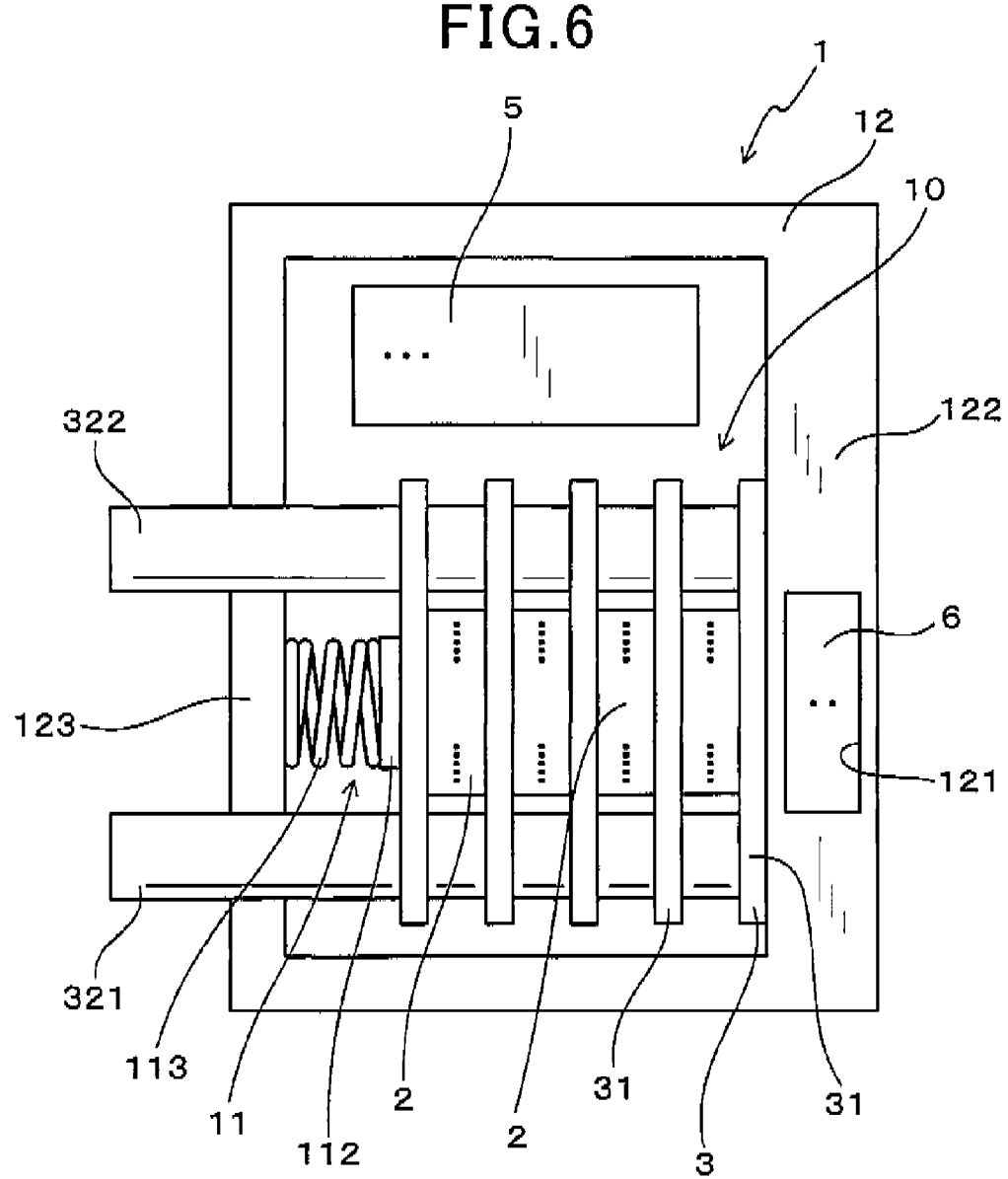
FIG. 6 shows a plan view of an electric power converter in a third embodiment.

The present embodiment is an example of the electric power converter 1 that has the force-pressing component 11 disposed between the laminated body 10 and the front wall part 123 in the frame 12, as shown in FIG. 6.

In the present embodiment, a coil spring 113 is used as the force-pressing component 11.

The coil spring 113 is disposed between the laminated body 10 and the front wall part 123, and between the coolant introducing pipe 321 and the coolant discharging pipe 322.

Moreover, the contacting board 112 intervenes between the coil spring 113 and the laminated body 10.

The coil spring 113 is disposed in a predetermined position in a state compressed in the lamination direction, and thereby, force-presses the laminated body 110 toward the rear wall part 122 side.

An end of the laminated body 10 in an opposite side of the force-pressing component 11 side is contacted with the rear wall part 122, and the cooling pipe 31 in the end of the cooler 3 is contacted surface-to-surface with the rear wall part 122.

In addition, the resistor accommodation part 121 united with the frame 12 is formed in the rear wall part 122.

Others are the same as those of the second embodiment.

In the present embodiment, heat transferring distance between the cooler 3 and the quick discharge resistor 6 can be shortened more.

Therefore, the quick discharge resistor 6 can be cooled more effectively.

In addition, it has the same function and effect as the second embodiment.

Furthermore, although the example that constitutes the force-pressing component 11 with the coil spring 113 is disclosed in the present embodiment, a leaf spring shown in the second embodiment can also be used to replaced the coil spring 113.

[Fourth Embodiment]

It should be appreciated that, in the following embodiment, components identical with or similar to those in the first embodiment are given the same reference numerals for the sake of omitting explanation.

Figure 7:
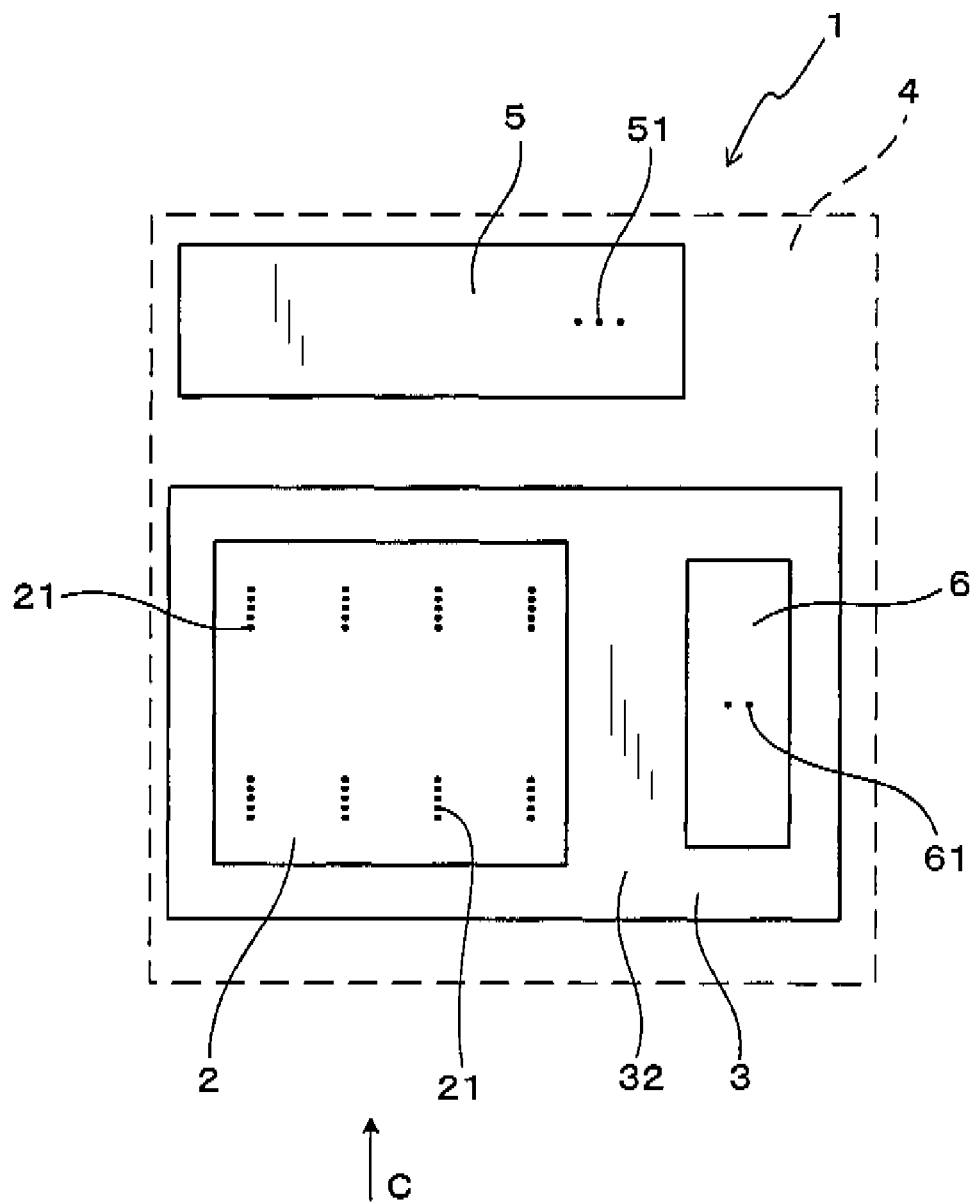
FIG. 7 shows a plan view of an electric power converter in a fourth embodiment.
Figure 8:
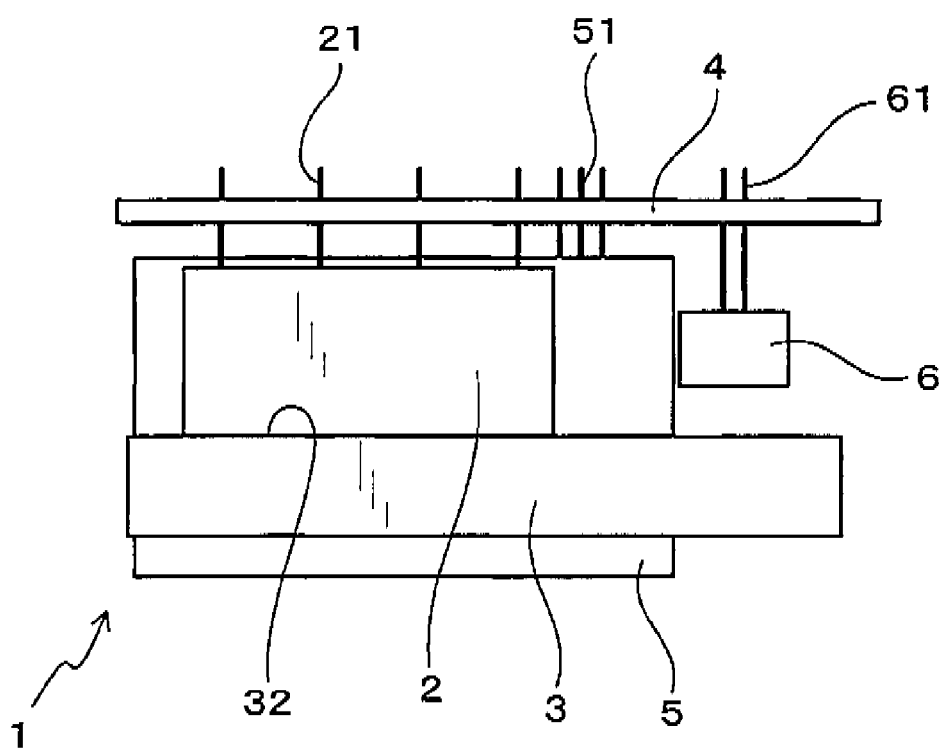
FIG. 8 shows a vertical view seen from C of FIG. 7

The present embodiment is an example of the electric power converter 1 that has the semiconductor module 2 disposed so as to contact one major surface of the cooler 3, as shown in FIG. 7 and FIG. 8.

It is different from the first embodiment that the laminated body (refer to the reference number 10 in FIG. 1 and FIG. 2) that has laminated the plurality of semiconductor modules and the plurality of cooling pipes is not constituted in the present embodiment.

As shown in FIG. 8, the cooler 3 has a cooling surface 32 that faces the circuit board 4, and the semiconductor module 2 is contacting onto the cooling surface 32.

Moreover, the semiconductor module 2 is unified having the plurality of semiconductor elements that constitute a set of switching circuits 200 (refer to FIG. 4) therein in the present embodiment.

Further, the semiconductor module 2 and the quick discharge resistor 6 are disposed between the cooler 3 and the circuit board 4.

Furthermore, the capacitor 5 is disposed in the position that does not overlap with the cooler 3 when seen from the normal direction of the circuit board 4, as shown in FIG. 7.

Furthermore, the capacitor 5 is disposed parallel to the cooler 3 and the semiconductor module 2 in the position in a direction that intersects perpendicularly to a direction of a row of the semiconductor module 2 and the quick discharge resistor 6.

Thus, the semiconductor module 2, the capacitor 5, and the quick discharge resistor 6 are disposed in parallel along the one major surface of the circuit board 4.

Others are the same as those of the first embodiment.

In the present embodiment as well as the first embodiment, the electric power converter that enables the quick electric discharge while reducing the number of parts, miniaturizing the body, and reducing assembling man-hours can be provided.

In addition, although the composition that the quick discharge resistor 6 is not contacting to the cooler 3 is shown in FIG. 8 of the present embodiment, the quick discharge resistor 6 can be more effectively cooled by contacting the quick discharge resistor 6 to the cooler 3.

What is claimed is:

1. An electric power converter comprising:
   a plurality of semiconductor modules that have a semiconductor element therein;
   a cooler that cools the semiconductor modules;
   a single circuit board provided with a semiconductor control circuit that controls the semiconductor modules;
   a capacitor electrically connected to the semiconductor modules; and
   a quick discharge resistor for discharging an electric charge accumulated in the capacitor; wherein:
   the single circuit board is provided with a discharge control circuit that controls a current that flows into the quick discharge resistor;
   the semiconductor modules, the cooler, the capacitor, and the quick discharge resistor are disposed on one major surface of the single circuit board;
   the discharge control circuit is formed on the single circuit board together with the semiconductor control circuit;
   the discharge control circuit is configured to permit the current to flow into the quick discharge resistor in an emergency situation;
   the cooler includes a plurality of cooling pipes;
   the plurality of semiconductor modules and the plurality of cooling pipes are laminated to constitute a laminated body;
   the quick discharge resistor is disposed at one end side of a laminating direction of the laminated body;
   the laminated body is disposed inside of a metal frame which includes a rear wall part disposed in one side of the lamination direction and a front wall part disposed in another side of the lamination direction;
   a resistor accommodation part is formed in the rear wall part of the frame and accommodates the quick discharge resistor; and
   the cooling pipes disposed on one end side of the laminated body are contacted surface-to-surface to the rear wall part of the frame.

2. The electric power converter according to claim 1, wherein,
   the semiconductor modules, the capacitor, and the quick discharge resistor are disposed in parallel along the one major surface of the single circuit board.

3. The electric power converter according to claim 1, wherein,
   the quick discharge resistor is disposed within the perimeter of the single circuit board when seen from a normal direction of the single circuit board.

4. The electric power converter according to claim 3, wherein,
   the quick discharge resistor has connecting terminals that are connected to the single circuit board and are formed by projecting them towards the single circuit board.

5. The electric power converter according to claim 1, wherein,
the quick discharge resistor is disposed adjoining the cooling pipes disposed on the one end in the laminated body.

6. The electric power converter according to claim 1, wherein,
a force-pressing component is disposed in the one end side in the lamination direction of the laminated body,
the force-pressing component intervenes between the laminated body and a part of a frame that holds the laminated body, and
the frame is formed unitarily with the resistor accommodation part where the quick discharge resistor is accommodated.

7. The electric power converter according to claim 6, wherein,
the force-pressing component is constituted by a leaf spring,
the frame has a pair of support sections that support both ends of the leaf spring, and
the resistor accommodation part is formed between the pair of support sections.

8. The electric power converter according to claim 1, wherein the emergency situation is a detected collision.

9. The electric power converter according to claim 1, wherein a resistance value of the quick discharge resistor in the emergency situation is configured to be smaller than the resistance value of the quick discharge resistor in a non-emergency situation.

* * * * *